United States Patent
Vines

(10) Patent No.: US 11,933,573 B1
(45) Date of Patent: Mar. 19, 2024

(54) FIREARM SHOT TRACKING SYSTEM

(71) Applicant: Anthony Vines, Glen Burnie, MD (US)

(72) Inventor: Anthony Vines, Glen Burnie, MD (US)

( * ) Notice: Subject to any disclaimer, the term of this patent is extended or adjusted under 35 U.S.C. 154(b) by 69 days.

(21) Appl. No.: 17/863,550

(22) Filed: Jul. 13, 2022

(51) Int. Cl.
*F41A 19/01* (2006.01)
*F41A 35/00* (2006.01)
*H04N 23/56* (2023.01)
*H04N 23/661* (2023.01)

(52) U.S. Cl.
CPC ............. *F41A 35/00* (2013.01); *H04N 23/56* (2023.01); *H04N 23/661* (2023.01)

(58) Field of Classification Search
CPC ...... H04N 23/56; H04N 23/661; F41A 35/00; F41A 19/01
USPC .............................................. 42/90; 89/41.05
See application file for complete search history.

(56) References Cited

U.S. PATENT DOCUMENTS

| | | | | |
|---|---|---|---|---|
| 6,598,329 B1 * | 7/2003 | Alexander | ............. | F41C 27/00 |
| | | | | 42/76.01 |
| 6,679,158 B1 * | 1/2004 | Hawkes | .................. | F41A 27/28 |
| | | | | 89/41.05 |
| 7,937,880 B1 * | 5/2011 | Fidlow | .................... | F41A 17/06 |
| | | | | 42/146 |
| 8,091,265 B1 * | 1/2012 | Teetzel | .................... | F41C 23/16 |
| | | | | 42/71.01 |
| 8,651,381 B2 * | 2/2014 | Rudich | .................... | F41G 3/142 |
| | | | | 235/407 |
| 8,908,045 B2 * | 12/2014 | Stewart | ................ | F41G 3/2605 |
| | | | | 348/169 |
| 9,267,761 B2 * | 2/2016 | Stewart | ...................... | F41G 3/00 |
| 9,591,255 B2 * | 3/2017 | Sakiewicz | ................ | F41G 1/35 |
| 9,773,287 B1 * | 9/2017 | Goo | ...................... | F41A 17/063 |
| 9,979,871 B2 * | 5/2018 | Kennair, Jr. | ........... | H04N 7/181 |
| 9,986,142 B2 * | 5/2018 | Sandoval | ............... | G03B 29/00 |
| 10,425,569 B2 * | 9/2019 | Teich | ................... | H04N 23/631 |
| 10,459,678 B2 * | 10/2019 | Samo | ........................ | F41A 9/62 |
| 10,911,712 B2 * | 2/2021 | Sakiewicz | .............. | G01S 19/13 |
| 11,306,987 B2 * | 4/2022 | Hedeen | ................ | H04N 23/651 |
| 2002/0163588 A1 * | 11/2002 | Holmberg | ............. | F41B 5/1492 |
| | | | | 348/E5.025 |
| 2006/0005447 A1 * | 1/2006 | Lenner | ...................... | F41G 3/06 |
| | | | | 42/111 |
| 2006/0082730 A1 * | 4/2006 | Franks | ............. | G08B 13/19647 |
| | | | | 348/E7.088 |
| 2008/0163536 A1 * | 7/2008 | Koch | ........................ | F41G 3/08 |
| | | | | 42/111 |
| 2014/0211020 A1 * | 7/2014 | Johns, Jr. | ................... | F41J 5/10 |
| | | | | 348/162 |

(Continued)

*Primary Examiner* — John Cooper
(74) *Attorney, Agent, or Firm* — Sanchelima & Associates, P.A.; Christian Sanchelima; Jesus Sanchelima

(57) ABSTRACT

A firearm shot tracking system including a camera assembly attached with a firearm assembly and a remote device assembly. The camera assembly includes a camera which may allow to record and track ballistic information by Bluetooth access. The firearm assembly includes a firearm which may be the housing for the camera which is placed on a bellow portion thereof to allow using the firearm and camera at once improving shooting abilities. The remote device assembly includes a remote device which can be monitored and display the information recorded by the camera. The camera is attached to the firearm to allow an easily use thereof while shooting and recording.

2 Claims, 3 Drawing Sheets

(56) References Cited

U.S. PATENT DOCUMENTS

| | | | | |
|---|---|---|---|---|
| 2016/0021329 A1* | 1/2016 | Sakiewicz | ............... | F41G 1/35 |
| | | | | 386/227 |
| 2016/0190859 A1* | 6/2016 | Blum | ................ | F41C 33/029 |
| | | | | 348/372 |
| 2017/0059265 A1* | 3/2017 | Winter | ............... | H04N 23/51 |
| 2017/0292813 A1* | 10/2017 | Speith | ............... | F41G 3/2655 |
| 2018/0213179 A1* | 7/2018 | Martin | ............... | G11B 27/19 |
| 2020/0084410 A1* | 3/2020 | Sakiewicz | ............ | G01S 3/8036 |

\* cited by examiner

FIREARM SHOT TRACKING SYSTEM

BACKGROUND OF THE INVENTION

1. Field of the Invention

The present invention relates to firearm shot tracking system and, more particularly, to a firearm shot tracking system that shaped camera attached to a rear side of the firearms' sight to record and track information which is transmitted to a remote device.

2. Description of the Related Art

Several designs for firearm shot tracking system have been designed in the past. None of them, however, include a camera module attached bellow a firearm to tack and transmit information to an external device.

Applicant believes that a related reference corresponds to U.S. Pat. No. 8,651,381 issued for a firearm sight with a high-definition camera assembly which is capable of capturing and tracking the path of a projectile and sends the information to a video display. Applicant believes that another related reference corresponds to U.S. Pat. No. 10,459,678 issued for a system for tracking and graphically displaying information on a user, a weapon, and munitions for the weapon. None of these references, however, teach of a firearm shot tracking system that is comprised of a camera module which is attached below the barrel or on top of the firearm's sights which is used to record, track and transmit ballistic information to a remote device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a provisional device to record the shot or ballistic information.

It is another object of this invention to provide a camera attachment on a front side of the firearm.

It is still another object of the present invention to provide a device for displaying the information in real time.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
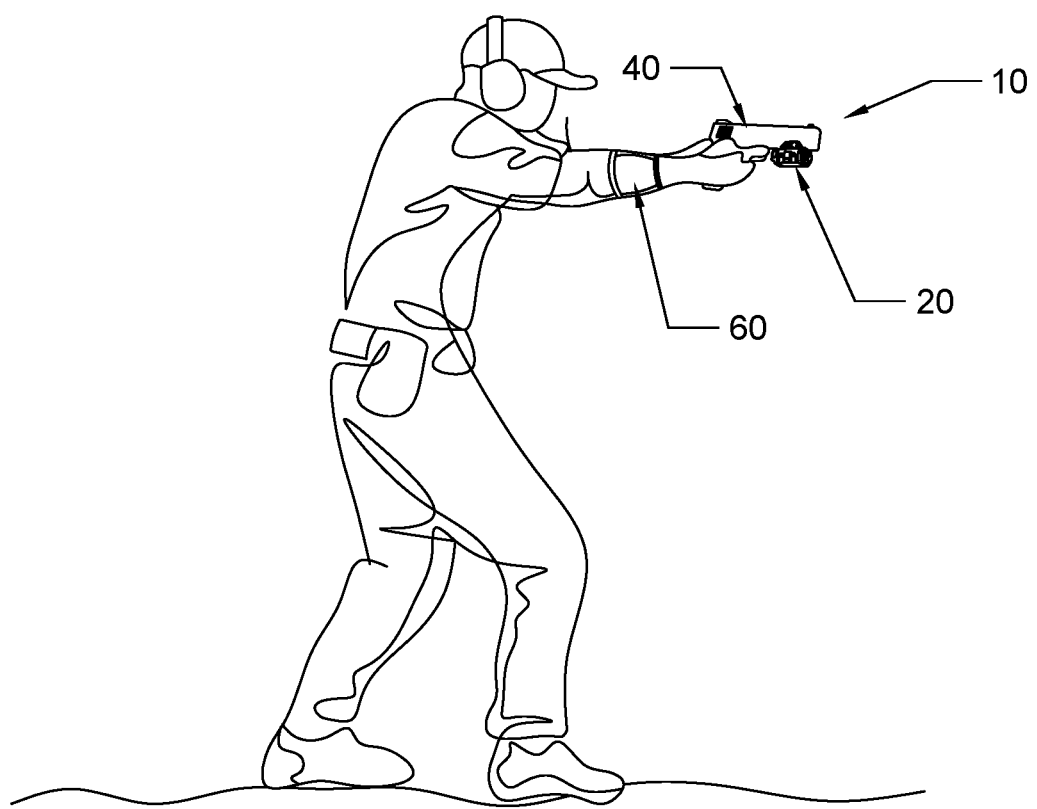
FIG. 1 represents an operational view of the present invention 10.

Referring now to the drawings, where the present invention is generally referred to with numeral 10, it can be observed that it basically includes a camera assembly 20, a firearm assembly 40, and a device assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
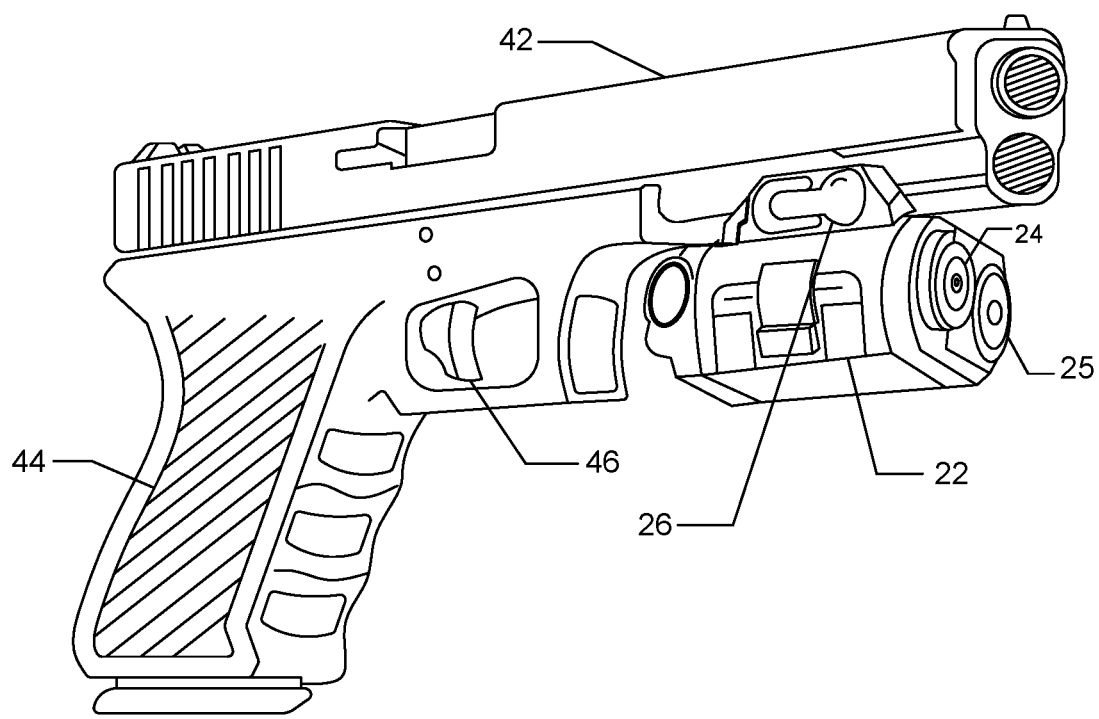
FIG. 2 shows a perspective isometrical view of the camera 22 mounted on a firearm 42.

The camera assembly 20 includes a camera 22, lens shutter 24, a flashlight and an attaching member 26. In a suitable embodiment, the camera 22 may be attached to a bottom side of the firearm assembly 40 wherein a top surface of the camera 22 is configured to stick to the front below side of the firearm assembly 40. In one embodiment, the camera 22 may be made of a polycarbonate material. Nevertheless, in other embodiments, other materials like, steel, glass fiber, aluminum, metal or any other variation thereof. The camera 22 may be configured to track, record ballistic information. In one embodiment, the camera 22 may have cylindric body with flat portions as shown in FIG. 2. Nevertheless, in other embodiments, the camera 22 may have an oval shape, square shape, rectangular shape, octagonal shape, hexagonal shape, trapezoidal shape or any other variation thereof. In a preferred embodiment, the camera 22 may be attached to a bottom side of the firearm assembly 40 allowing to record ballistic data. Nevertheless, in another embodiment, the camera 22 may be attached to a rear side of the firearm assembly 40 which also allows to record ballistic data.

As best observed in FIG. 2 the camera 22 may have the lens shutter 24 attached to a front side allowing to obtain the information which can be saved in the camera 22. The lens shutter 24 and the flashlight 25 may be suitable to be made of a glass fiber. Nevertheless, in another embodiment, a material like glass may also be suitable for the lens shutter 24 and the flashlight 25. It should be considered that lens shutter 24 may be configured to deliver the information obtained when using the firearm assembly 40 wherein the camera 22 may relate to the firearm assembly 40 in one embodiment. The lens shutter 24 may be suitable to have a shape that conforms with the shape of the camera 22. Nevertheless, in other embodiments, the lens shutter 24 may have a square shape, rectangular shape, octagonal shape, hexagonal shape, trapezoidal shape, or any other variation thereof. In a preferred embodiment the lens shutter 24 may include a night vision feature which may allow to see in dark areas. In another embodiment, the camera 22 may have the flashlight 25 attached proximal to the lens shutter 24 allowing to use the camera 22 in dark areas. It may be considered that the camera 22 and the flashlight 25 may be a High Definition (HD) system. The flashlight may have a circular shape that conforms with the distal end of the camera 22 as best observed in FIG. 2.

Figure 3:
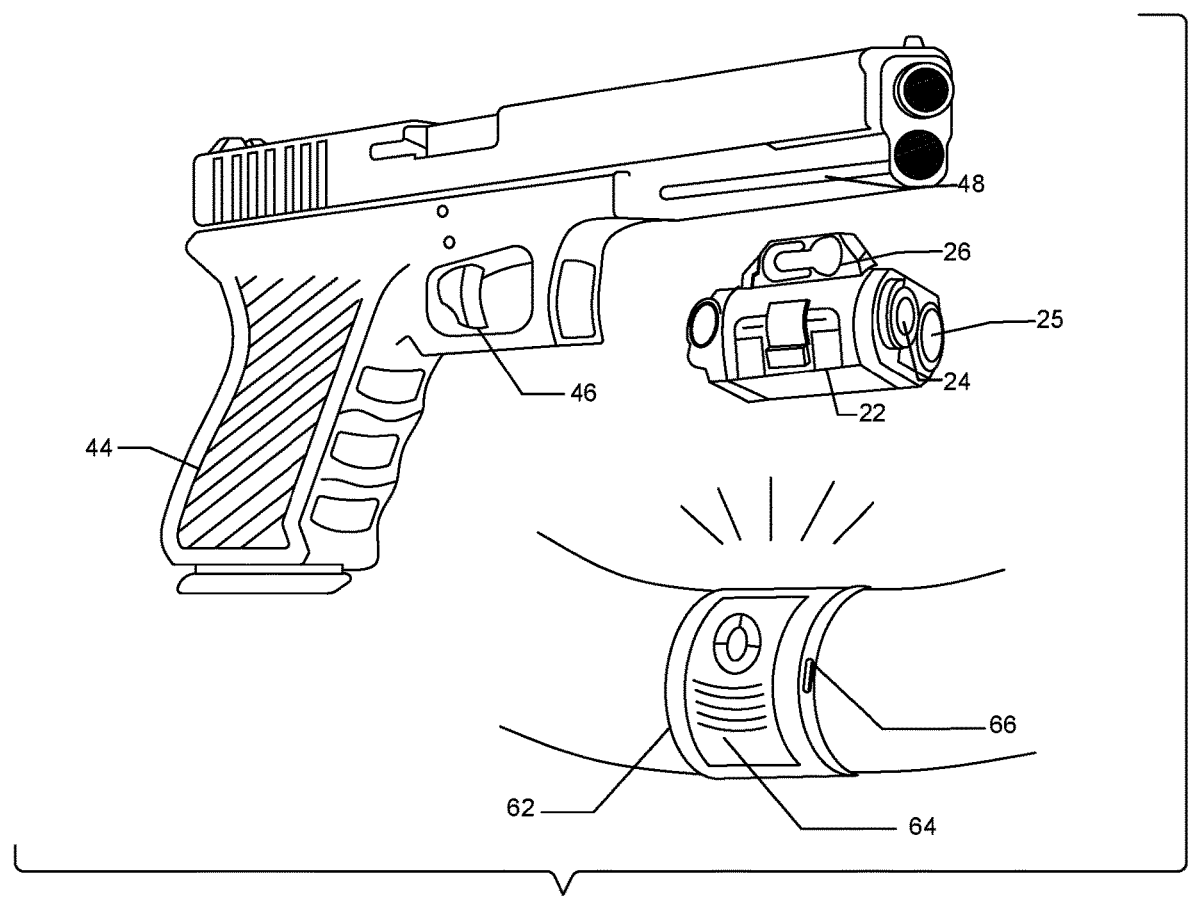
FIG. 3 illustrates an exploded view of the drawing camera 22, firearm 42 and a remote device 62.

As best observed in FIG. 3 the camera 22 may include an attaching member 26 which is attached to a top surface thereof. In a suitable embodiment the attaching member 26 may be attached to the top surface of the camera 22. Nevertheless, in another embodiment, the attaching member 26 may be attached to the bottom surface or the side surface of the camera 22 in an embodiment wherein the camera 22 is attached to a top portion of the firearm assembly 40. The attaching member 26 may be configured to attach the camera 22 to the firearm assembly 40. The attaching member 26 may be suitable to be made of a magnetic material allowing stability. Nevertheless, other materials like rubber, metal, aluminum, plastic or any other variation thereof, may be suitable for the attaching member 26 using additional fastener like clamps or a variation thereof. It is to be considered that camera 22 may use another configuration to be attached to the firearm assembly 40. The attaching member 26 may be configured to stabilize the camera 22 when the firearm assembly 40 is fired, allowing to record with stable recording and tracking of ballistic data. In a preferred embodiment, the camera 22 may have a Bluetooth system which is integrated thereof to allow the remote device 62 connect and monitor information transmitted thereof by the camera 22. The camera 22 may have the Bluetooth with a configured access by the remote device 62 allowing and easy access with external devices.

The firearm assembly 40 includes a firearm 42, a handle 44, a trigger 46 and an attaching portion 48. In one embodiment, the firearm 42 may be suitable to have a gun shape. In a suitable embodiment, the firearm 42 may be made of a steel material. Nevertheless, other materials like iron, anodized aluminum or any other variation thereof, may be suitable for the firearm 42. It is to be understood that firearm 42 may have a handle 44 and a trigger 46 mounted thereof wherein the handle 44 and the trigger 46 may be made of a material similar as the firearm 42 may me made of. In one embodiment, the handle 44 and the trigger 46 may be configured to fasten and shot respectively. The firearm 42 may have a surface thereof wherein the camera. 22 may be attached to. In a suitable embodiment, the firearm 42 may include an attaching portion 48 which may be placed along the bottom surface of the firearm 42 as best observed in FIG. 3 which allows the camera 22 to be attached thereto. The attaching portion 48 may be related with the attaching member 26 and each one may have a shape that conforms the shape of each other wherein the attaching member 26 may have a clamp body to attach the slidable body of the attaching portion 48. In one embodiment, the attaching portion 48 may be a slidable hollow portion. Nevertheless, in another embodiment, the attaching portion 48 may have a predetermined elongated slot to attach the attaching member 26 in a pressure configuration. The attaching portion 48 may have a body that conforms with the below portion of the firearm 42. It is to be understood, that any other attaching configuration may be suitable for the firearm 42. In another embodiment, the attaching portion 48 may be made of a magnetic material which may attract the attaching member 26 to attach said camera to said firearm 42.

The remote device assembly 60 includes a remote device 62 and a display system 64 and an input 66. The remote device 62 may have a clamp body as best observed in FIG. 3. The remote device 62 may be configured to receive the recorded and transmitted information by the camera 22. The information that is received is displayed on a display system 64. In a suitable embodiment, the remote device 62 may also be configured to be attached to the arm's user. Nevertheless, in another embodiment the remote device 62 may be configured to be a transportable device. In a suitable embodiment, the remote device 62 may be made of plastic material. Nevertheless, in other embodiments, materials like polyester, aluminum, steel, rubber, iron, gold, plate, or any other variation thereof. The display system 64 may be placed on the remote device. In one embodiment, the display system 64 may have a rectangular shape partially covering the remote device 62. Nevertheless, in other embodiments, the display system 64 may have a circular shape, a triangular shape, a hexagonal shape, a trapezoidal shape or any other variation thereof. The input 66 may be configured to attach any external device thereof to allow transmit data or charge said remote device 62. In a suitable embodiment, the input 66 may be a universal input. Nevertheless, in other embodiment, the input 66 may be a usb type, usb-c type, lightning type, micro-usb type or any other variation thereof. The input 66 may have a rounded body as best observed in FIG. 3. It is to be considered that the input 66 may be made of a material similar which the remote device 62 may be made of.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A firearm shot tracking system, consisting of:
   a camera assembly including a camera wherein said camera is has a prism body, said camera has a lens shutter which allows the camera to track and record ballistic information, said lens shutter integrates night vision, said flashlight allow to illuminate dark areas when required, said camera has an attaching member placed on the top surface thereof, said attaching member integrates a magnetic material, said attaching member is configured to help the camera to be stabilized through has a clamp configuration, said camera having a tracking system which is transmitted by a Bluetooth system;
   a firearm assembly including a firearm wherein a distal end has an attaching portion, said firearm has a trigger to allow to shoot and allow the camera to record, said firearm includes an attaching portion which has a cylindric body, said attaching portion is attached to the bottom of the firearm by a distal end, said attaching portion is configured to attach said attaching member by a pressure configuration on slidable body of said attaching portion, wherein said attaching portion incorporates a magnetic material to attract and fix said attaching member; and
   a remote device assembly including a remote device which relates said firearm, said remote device may have a clamp body that is configured to be mounted around the user's arm, said remote device has a display system which extends over a flat top surface over said remote device, said remote device collects and display ballistic information through said display system when using the trigger and shooting recorded by said camera, said remote device and camera may be related by a wireless connection, said remote device assembly further includes an input, wherein said input is a USB-type port, said input further serves to charge said remote device.

2. A firearm shot tracking system, comprising of:
   a camera assembly including a camera wherein said camera is has a prism body, said camera has a lens shutter which allows the camera to track and record ballistic information, said lens shutter integrates night vision, said flashlight allow to illuminate dark areas when required, said camera has an attaching member placed on the top surface thereof, said attaching member integrates a magnetic material, said attaching member is configured to help the camera to be stabilized device which through has a clamp configuration, said camera having a tracking system which is transmitted by a Bluetooth system;

a firearm assembly including a firearm wherein a distal end has an attaching portion, said firearm has a trigger to allow to shoot and allow the camera to record, said firearm includes an attaching portion which has a cylindric body, said attaching portion is integrated at the bottom of the firearm by a distal end, said attaching portion is configured to attach said attaching member by a pressure configuration on a slidable body of said attaching portion, wherein said attaching portion incorporates a magnetic material to attract and fix said attaching member, said camera in combination with said flash light incorporates a High Definition system; and a remote device assembly including a remote device which relates said firearm, said remote device may have a clamp body that is configured to be mounted around the user's arm, said remote device has a display system which extends over a flat top surface over said remote device, said remote device collects and display ballistic information through said display system when using the trigger and shooting recorded by said camera, said remote device and camera may be related by a wireless connection, said remote device assembly further includes an input, wherein said input is a USB-type port, said input further serves to charge said remote device.

* * * * *